(No Model.) 2 Sheets—Sheet 1.

C. SELLENSCHEIDT & L. LEPKE.
FILTER.

No. 519,275. Patented May 1, 1894.

(No Model.) 2 Sheets—Sheet 2.

C. SELLENSCHEIDT & L. LEPKE.
FILTER.

No. 519,275. Patented May 1, 1894.

Witnesses:

Inventors:
Carl Sellenscheidt
Leonhard Lepke
By Richards &
their Attorneys.

UNITED STATES PATENT OFFICE.

CARL SELLENSCHEIDT AND LEONHARD LEPKE, OF BERLIN, GERMANY.

FILTER.

SPECIFICATION forming part of Letters Patent No. 519,275, dated May 1, 1894.

Application filed December 2, 1892. Renewed March 30, 1894. Serial No. 505,780. (No model.)

*To all whom it may concern:*

Be it known that we, CARL SELLENSCHEIDT and LEONHARD LEPKE, subjects of the Emperor of Germany, and residents of Berlin, Germany, have invented certain new and useful Improvements in Filters, of which the following is a specification.

Our invention consists primarily of a filter in which the filtering material which is subjected to the pressure of the liquid is placed in a funnel shaped or conical receptacle by which the pressure of the liquid to be filtered will force or pack the material closely against the walls of said receptacle and thus prevent the said liquid from forming channels or outlets down along the inner side of the receptacle wall and between it and the mass of filtering material. This defect is present in filters having cylindrical chambers or receptacles for the mass of filtering material and this impairs the usefulness of such filters. In our invention the greater the pressure the less will be the liability for the liquid to pass through the receptacle unfiltered.

Our invention includes other features hereinafter set forth.

Figure 1:
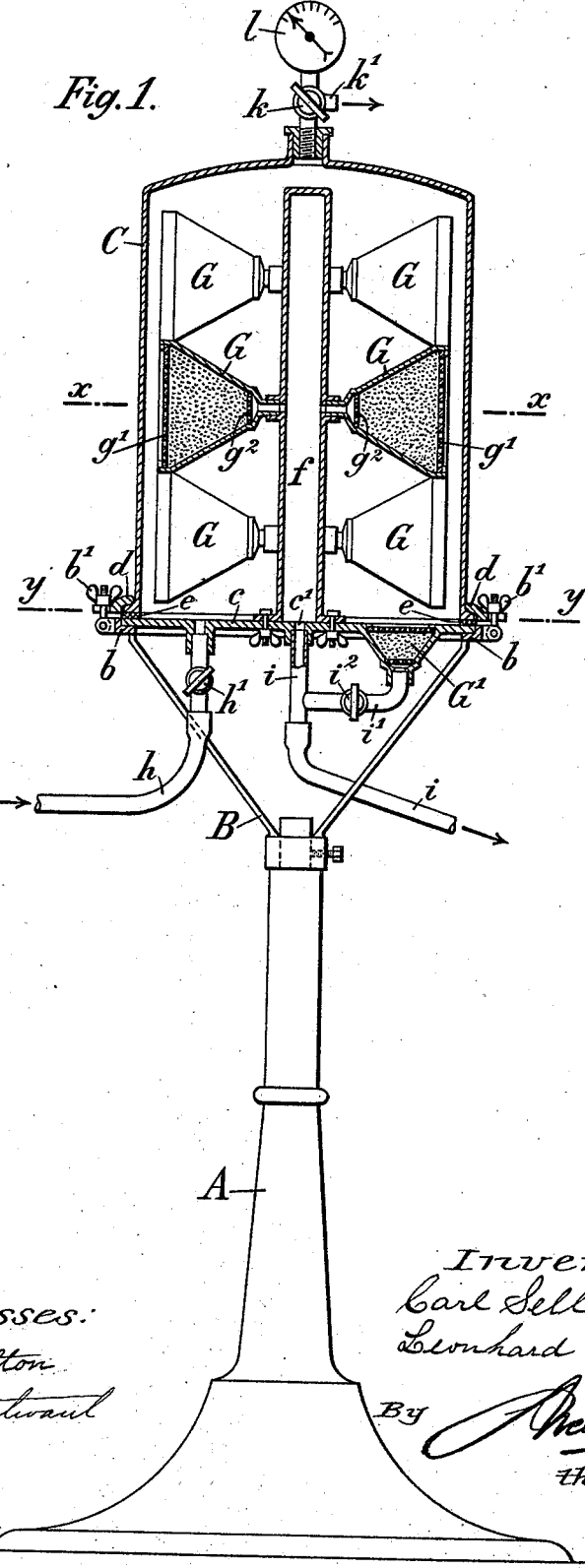
Figure 2:
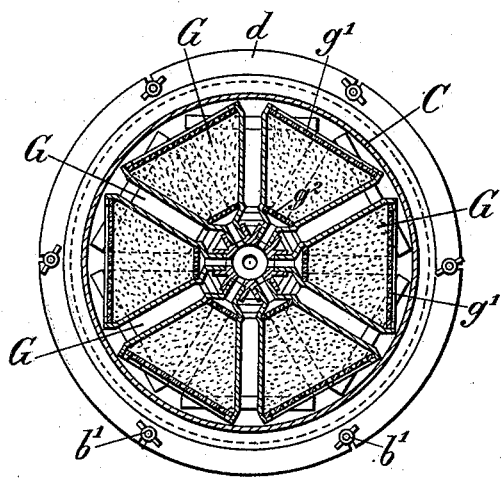
Figure 3:
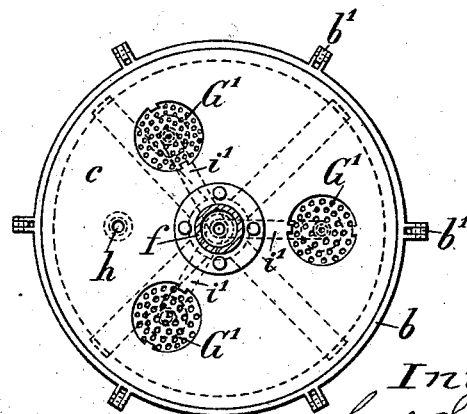

In the drawings, Figure 1, is a central vertical section through the filter apparatus; Fig. 2, a sectional plan view on line $x$—$x$ of Fig. 1, and Fig. 3, a plan view of the bottom of the filter, on line $y$—$y$.

A, is a stand upon which the frame B, which carries the filter is fixed. The filter holder consists of a china bottom plate $c$, supported by the ring $b$, of the frame B, and of a casing C, made of glass which is provided with a flange at its lower edge. A ring $d$, extends over the flange, which ring is pressed down by means of the bolts pivoted upon the ring $b$, of the frame B, and entering slits in the ring $d$, where they are clamped by the thumb nuts $b'$, thus holding together the case C, the bottom plate $c$, and the frame B. A piece of rubber packing $e$, is placed between the flange of the case C, and the bottom plate $c$.

In the middle of the bottom plate $c$, over the exit opening $c'$ a hollow china column, closed at its upper part is located from the sides of which a number of sockets extend radially into which the funnel shaped filtering chambers G, are fixed. There are several rows of these filter chambers or receptacles, the one above the other and they are put close against each other in order to be able to place as many as possible of them and at the same time the largest possible number in the apparatus. Each of these filtering receptacles consists of a funnel shaped case of china which is closed at its ends by the sieves $g'$ and $g^2$ which are also made of china between which the filtering mass is located. The inside sieve $g^2$, is placed loosely in the funnel, but the outside sieve $g'$ is fixed after the filtering mass has been put in the funnel, by any suitable means in the mouth of the funnel. The funnels G, are provided with nipples at their interior extremities by which they are screwed into or in some other way fixed to the sockets in the column $f$. The liquid that must be filtered is forced into the case C, through the pipe $h$, which is provided with a stop cock $h'$ and after having filled the same it passes through the sieves $g'$ into the several filtering receptacles G, in which it will press the filtering mass, close against the walls of the funnel and this being the case, it cannot pass unfiltered between the filtering mass and the walls of the funnel. The filtered liquid gathers in the hollow column $f$, and flows off through the pipe $i$. In order that the last of the liquid in the case C, does not remain unfiltered in the same or does not flow off unfiltered we have arranged a number of funnel shaped filtering receptacles G' about the bottom plate $c$, they are of the same construction as the filtering receptacles G, and are connected with the exit pipe $i$, by a pipe $i'$. The last of the liquid remaining in the case passes through these filtering receptacles G', and issues also into the main exit pipe $i$, when filtered. The out flow through the filtering receptacles G' which are smaller than the filtering bodies G, can be prevented by the means of cocks $i^2$, located in the pipes $i'$ in order to have use of these filtering receptacles when desired and to avoid the necessity of cleansing the same too often. The cocks $i^2$ are opened only when the liquid in the case C, has reached down below the lowest row of the filtering receptacles G. A three way cock carrying a manometer *l*, showing the pressure in the case is placed on top of the case C, while the side nozzle K' of the three way cock serves for the letting out or in of air from or to the case.

The described filter can be easily taken apart and cleansed on account of the simplicity of its construction.

We claim—

In combination, the casing C, having the hollow column, and the inlet and outlet pipes, the latter leading from the column, the filtering receptacles extending radially from the hollow column the supplemental filtering receptacles G' about the bottom of the casing C, and the pipes *i'*, extending therefrom to the main outlet pipe *i*, substantially as described.

In testimony whereof we have hereunto set our hands in presence of two witnesses.

CARL SELLENSCHEIDT.
   LEONHARD LEPKE.

Witnesses:
 GUSTAV GSELL,
 L. A. EDWARDS.